Patented May 29, 1928.

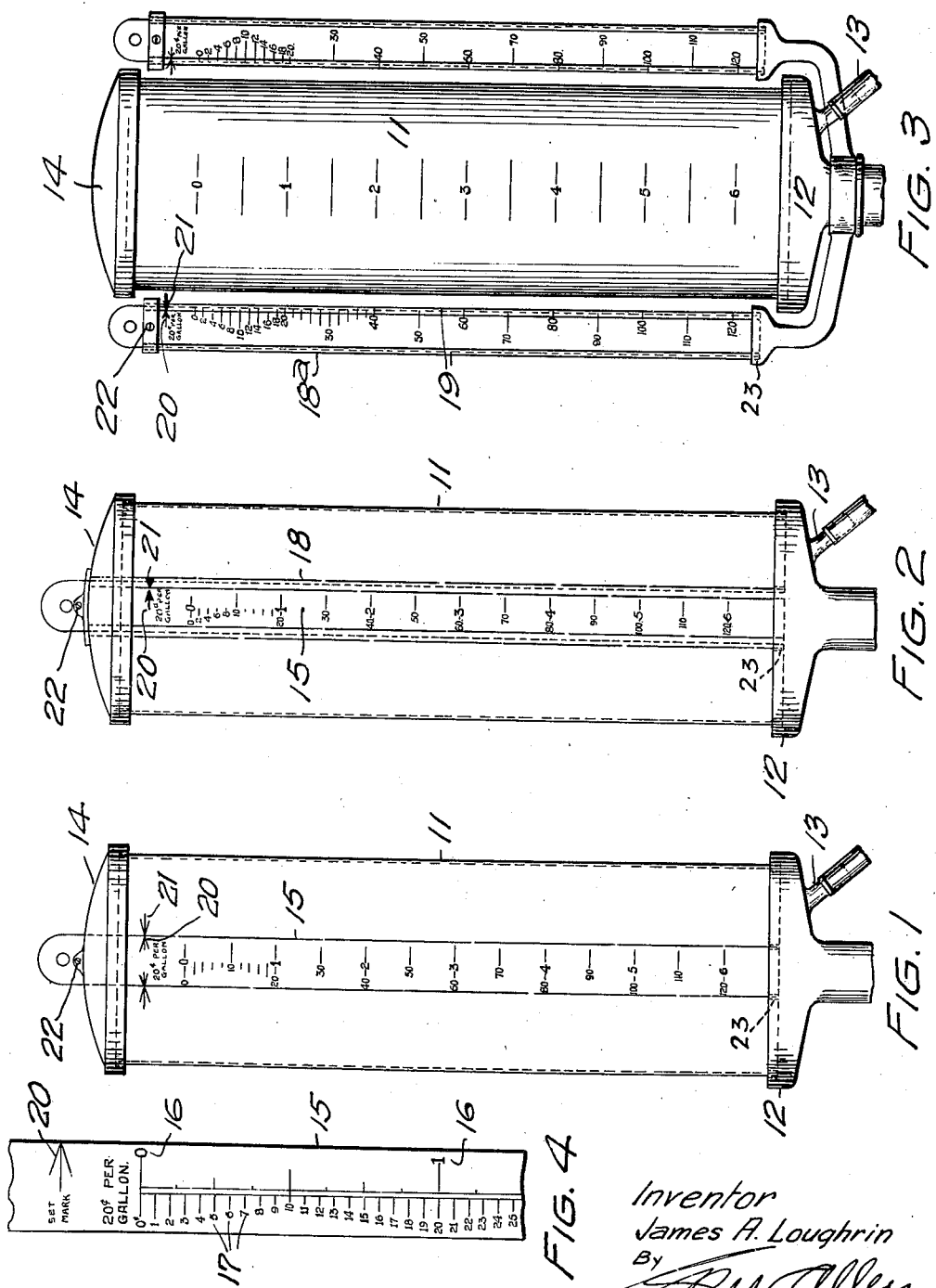

1,671,432

UNITED STATES PATENT OFFICE.

JAMES A. LOUGHRIN, OF WEST TORONTO, ONTARIO, CANADA.

SCALE FOR DISPENSING APPARATUS.

Application filed June 18, 1925. Serial No. 38,098.

This invention relates to improvements in quantity and cost calculating devices for liquid dispensing apparatus and the like, and the object of the invention is to provide a simple and inexpensive apparatus, such as a nozzle-controlled gasoline pump, in which the gasoline is first raised into a glass jar or other receptacle permitting the level of gasoline and the discharge thereof to be seen by the purchaser. A further object of the invention is to provide means for introducing any one of a series of price calculating scales into predetermined relation with the gasoline receptacle and therefore of the level of the gasoline therein, to the end that any amount of gasoline may be withdrawn and the cost of same indicated by observing the indications of the scale in line with the level of the gasoline. Various other objects and advantages may be ascertained from the following description.

Briefly, the invention embodies the provision of a series of price calculating scales, which may or may not include quantity indications, the several scales of the series being calculated each according to a different price. Means are provided for supporting a selected scale of the series in predetermined relation to the gasoline container and to the zero level of gasoline therein, to the end that the level of gasoline remaining in the receptacle will indicate on the scale the price that is to be charged for the gasoline which has been withdrawn. The scales may be disposed within the receptacle without protection or may be disposed in a holder located either within or without the receptacle, movably or otherwise.

In the accompanying drawings which illustrate several embodiments of the invention;—

Fig. 1 is an elevation of a gasoline receptacle disclosing a scale located therein.

Fig. 2 is a view similar to Figure 1 disclosing a scale located in a holder within the gasoline receptacle.

Fig. 3 is a similar view showing a scale located in a movably mounted holder outside the receptacle.

Fig. 4 is a plan view of a fragment of one form of scale.

Referring more particularly to the drawings, 11 designates a gasoline receptacle which, in the form illustrated, is a cylindrical vessel of glass or other suitable material, mounted on a base 12 through which gasoline may be supplied to the vessel and provided with an outlet 13 through which gasoline may be withdrawn from the vessel. The top of the vessel is closed by a cover 14. It will be understood that the exact construction of the vessel and the manner of supplying gasoline to and withdrawing the same therefrom are immaterial to the present invention, and that any type or arrangement other than that herein illustrated for the purposes of description may be utilized.

According to this invention, a series of calculating scales is provided, of which one is fragmentarily shown in detail in Figure 4. Each of these scales, designated 15, is calculated for a certain price of gasoline or other commodity per unit of measure, for example, cents per gallon, so that in the event of fluctuations in the price of the commodity the scales may be substituted one for another. Each scale comprises a strip of suitable material and of a length suitable to the container with which it is to be used. The length of the strip is divided into units, each representing the differences in level between units of measure in the container, and these units in the length of the scale are divided into fractions either according to the normal fractions of the unit of measure or according to the price unit, for example, the unit of measure on the scale may be divided into halves, quarters, eighths, sixteenths and so on of a gallon and opposite each fraction of a gallon may be inscribed a price indication. This arrangement is admirable where the price per gallon is similarly divisible without producing fractions of cents in the price. On the other hand, the length unit on the scale indicating a measure unit may be divided strictly according to the price. For example, as indicated in Figure 4, each length unit being the distance between adjacent quantity indications 16 may be divided according to the number of cents in the price. Thus, for a price of twenty cents per gallon, the length units on the scale will be divided into twentieths. The fact that such a division gives half and quarter gallon indications at the five, ten and fifteen cent graduations is convenient. When the price is nineteen cents or twenty-one cents per gallon, the unit distance on the scale may be divided into nineteen or twenty-one equal parts or may be divided according to volume measure and the price of each fraction of the unit of volume measure indicated to the nearest cent. Thus, each scale serves as a price calculating means and may serve also as a quantity indicating means. The scale may be located within the receptacle 11 without any protecting means, as shown in Figure 1, in which case the material of the scale and of the markings thereon must be of such nature that they will not be affected by the gasoline or other liquid in the vessel. On the other hand, the scale may be mounted in a holder 18 disposed within the vessel, as shown in Figure 2, or the scale may be mounted in a holder 18ª located externally of the vessel and adjacent thereto. In the latter case, the holder may be rigidly mounted on the base of the vesel or may be revoluble about the vessel, so as to display the price scale in the manner most convenient to the customer. The volume measure indications may be etched or otherwise displayed on the container itself, as is usually the case, or may be confined to the scale 15 or may be found in both places. Obviously, a scale cannot be disposed within a graduated vessel not designed for such use, on account of the displacement of liquid effected by the scale which would render any markings on the vessel inaccurate. Therefore, any graduations on the vessel must be located with reference to the displacement effected by the scale and, similarly, the length of divisions on the scale must be calculated with reference to the vessel and the displacement of the scale therein.

The holder may be of any suitable type which will render the graduations of the scale visible. One suitable form of scale would be a sealed glass tube containing a strip of paper or other material upon which the divisions are marked. Such a scale could be used within a container without any holder. On the other hand, the glass tube could be regarded as the holder and permanently installed in the vessel, the graduated strip of paper constituting the scale being inserted or removed through the open top of the tube, which may or may not project through the top 14 of the receptacle. As shown in Figure 2, the open top of the holder projects through the top of the receptacle, so that the scale may be inserted or removed without opening the receptacle. When the holders are disposed externally of the receptacle, they may take the form of grooved guides 19 of metal or other suitable material, in the grooves of which the scale may be slidably arranged. The holder is not necessarily disposed to one side of the receptacle, as shown in Figure 3, but may be disposed flat against the receptacle so as to have substantially the appearance indicated in Figure 2. In such a case, the scale may be a strip of transparent material through which the gasoline level may be clearly seen.

Whatever form the scale takes and whatever the manner of its association with the receptacle, there should be provided on the scale a setting mark, designated 20, for adjustment to a similar setting mark 21 on the holder or on the receptacle or its cover, so that the scale may be accurately positioned to given true indications of price or quantity or both. Some form of locking means is preferably provided to secure the scale when properly adjusted in position. This locking means may take the form of a simple set screw 22 in the holder to clamp the scale in position in the holder, but may be otherwise arranged according to the form and disposition of the scale. In the forms of Figures 1 and 2, the upper part of the scale is supported by the cover 14 either directly or through the holder, while in the form of Figure 3 the upper end of the scale is supported by the holder. In all the forms, the lower end of the scale is supported in a socket 23 either directly or through the holder, so that by virtue of the double support the scale will be held in predetermined relation to the receptacle. The transparent receptacles of gasoline pumps of the type previously referred to are graduated from zero at the top of the receptacle downwardly and the level of gasoline remaining in the receptacle indicates on the scale the amount which has been withdrawn. The price scales are graduated in a similar manner, the indication at any level giving the price to be charged for gasoline withdrawn down through that level. Thus, in Figure 3, for example at the 5½ gallon level, the price indication is $1.10 based on a price of twenty cents per gallon.

The operation of the device is extremely simple. A scale suitable for the price to be charged is attached to the receptacle and adjusted according to the setting marks on the scale and receptacle or other part. The scale is then clamped in place. Before serving a customer, the glass receptacle is filled to the zero mark and the necessary gasoline removed through the outlet 13. In consequence, the level of the gasoline in the receptacle falls and when the discharge is stopped the level is noted. This level indicates on the quantity scale the amount of gasoline taken and on the price scale the price to be charged. In this way, a great deal of time can be saved, argument avoided and mistakes in price calculation eliminated. When the price changes, all that is necessary is to withdraw one scale and insert a new scale, adjusting the same as before. A great advantage obtainable through this invention is that the customer may obtain exactly the amount of gasoline paid for. Thus, when the price is twenty-one cents per gallon, in place of taking 5½ measured gallons for $1.16, the customer may take the fraction over or under the 5½ gallons, thus getting exactly $1.16 worth or $1.15 worth.

While the invention has been described principally in connection with the sale of gasoline, it is obvious that the same may be applied to the sale of other commodities. While the same has not been shown, it will be understood that the scale may be arranged to be moved by a float or the like relatively to an indicating point, although the embodiments disclosed are preferred as being the most simple.

Having thus described my invention, what I claim is:—

1. In liquid dispensing apparatus, a receptacle in which the level of contents may be observed through the wall of the receptacle, an apertured cover for said receptacle, a vertically disposed scale holder within the receptacle in alignment with the cover aperture, and a scale insertable in and removable from the holder through the cover aperture.

2. In liquid dispensing apparatus, a receptacle in which the level of contents may be observed through the wall of the receptacle, an apertured cover for said receptacle, a vertically disposed scale holder within the receptacle in alignment with the cover aperture, and a scale insertable in and removable from the holder through the cover aperture, there being a setting mark on the scale and a setting mark on the holder to which the setting mark of the scale may be adjusted to accurately position the scale with reference to the receptacle, and means for clamping a scale in the holder.

3. In liquid dispensing apparatus, a receptacle in which the level of contents may be observed through the wall of the receptacle, an apertured cover for the receptacle, a vertically disposed scale within the receptacle extending at its upper end through the cover aperture, and means at the bottom of the receptacle to hold the scale.

4. In liquid dispensing apparatus, a receptacle in which the level of contents may be observed through the wall of the receptacle, a removable strip extending from top to bottom of the receptacle having a scale inscribed thereon, and means to hold the strip in position for comparison of the scale with the level of contents of the receptacle comprising a socket at the bottom into which the lower end of the strip enters, a member at the top encircling the strip near its upper end, and means carried by said member to clamp the strip thereto and secure the scale in predetermined relation to the receptacle.

In witness whereof, I have hereunto set my hand.

JAMES A. LOUGHRIN.